(12) United States Patent
Geoffroy et al.

(10) Patent No.: US 8,612,070 B2
(45) Date of Patent: Dec. 17, 2013

(54) DECISION AID DEVICE FOR ASSISTING THE LANDING OF AN AIRCRAFT ON THE DECK OF A SHIP

(75) Inventors: Rémi Geoffroy, Saint Medard en Jalles (FR); Patrick Garrec, Merignac (FR); Yannick Thiry, Biganos (FR); Patrick Cazaux, Le Pian Medoc (FR)

(73) Assignee: Thales, Neuilly sur Seine (FR)

( * ) Notice: Subject to any disclaimer, the term of this patent is extended or adjusted under 35 U.S.C. 154(b) by 546 days.

(21) Appl. No.: 12/945,602

(22) Filed: Nov. 12, 2010

(65) Prior Publication Data

US 2011/0118910 A1 May 19, 2011

(30) Foreign Application Priority Data

Nov. 13, 2009 (FR) ...................................... 09 05470

(51) Int. Cl.
*G06F 19/00* (2011.01)
*G06G 7/70* (2006.01)
(52) U.S. Cl.
USPC .................................... 701/16; 701/5; 345/22
(58) Field of Classification Search
USPC .......................................... 701/16, 5; 345/22
See application file for complete search history.

(56) References Cited

U.S. PATENT DOCUMENTS

| | | | | |
|---|---|---|---|---|
| 6,064,924 A | * | 5/2000 | Fleischmann | 701/16 |
| 6,114,975 A | * | 9/2000 | Guillard | 340/945 |
| 8,155,806 B2 | * | 4/2012 | Suddreth et al. | 701/16 |
| 8,195,347 B2 | * | 6/2012 | Boorman | 701/16 |
| 8,380,369 B2 | * | 2/2013 | Geoffroy et al. | 701/4 |
| 2002/0147544 A1 | * | 10/2002 | Nicosia et al. | 701/207 |
| 2007/0021878 A1 | | 1/2007 | Builta | |
| 2008/0071431 A1 | | 3/2008 | Dockter et al. | |
| 2009/0055038 A1 | | 2/2009 | Garrec et al. | |
| 2009/0115637 A1 | * | 5/2009 | Naimer et al. | 340/979 |
| 2009/0243911 A1 | | 10/2009 | Cornic et al. | |
| 2009/0315755 A1 | | 12/2009 | Cornic et al. | |
| 2010/0256841 A1 | | 10/2010 | Garrec et al. | |
| 2011/0066307 A1 | * | 3/2011 | Hiebl | 701/16 |
| 2011/0264312 A1 | * | 10/2011 | Spinelli et al. | 701/16 |
| 2012/0130566 A1 | * | 5/2012 | Anderson | 701/16 |

FOREIGN PATENT DOCUMENTS

DE 10 2007 050 246 A1 4/2009
WO WO2009042309 * 4/2009

* cited by examiner

*Primary Examiner* — Fadey Jabr
*Assistant Examiner* — Paula L Schneider
(74) *Attorney, Agent, or Firm* — Baker & Hostetler LLP (57) ABSTRACT

A device for aiding the deck-landing of an aircraft, the aircraft being controlled remotely from a mobile station, such as a ship, includes means for receiving data from the aircraft, notably attitudes of the aircraft, the aircraft hovering ready to land on deck, the deck-landing decision having to be taken under certain conditions that must all be met, the device including a computer making it possible to deliver temporal indicators indicating that all the conditions are met. The device includes a temporal gauge including a temporal graduation indicating mobile graphical zones representing the periods during which all the conditions are met for authorizing a deck-landing.

17 Claims, 4 Drawing Sheets

DECISION AID DEVICE FOR ASSISTING THE LANDING OF AN AIRCRAFT ON THE DECK OF A SHIP

CROSS-REFERENCE TO RELATED APPLICATION

This application claims priority to foreign French patent application No. FR 0905470, filed on Nov. 13, 2009, the disclosure of which is incorporated by reference in its entirety.

FIELD OF THE INVENTION

The present invention relates to the field of devices for monitoring and checking a rotary-wing aircraft that is ready to land on deck on a mobile vehicle such as a ship. More particularly, the invention pertains to devices summarizing a certain number of parameters relating to the landing conditions making it possible to assist an operator by providing a decision aid.

BACKGROUND OF THE INVENTION

Generally, pilotless aircraft checking and monitoring missions may be of various kinds. Notably, they may relate to the checking of the takeoff or landing phases or else the checking of the proper following of the flight plan during the navigation of such an aircraft.

An operator usually has a display system at his disposal, allowing him to check the behaviour of the aircraft. This system allows the operator to make decisions such as a mission cancellation decision or, if need be, a landing authorization decision or else a continuation of the mission.

In the course of the takeoff or landing phases, the operator must be reactive. In case of incidents, the mission must be rapidly interrupted so as to provide for the safety, firstly, of the onboard personnel in proximity to the landing zone and secondly, of the craft itself.

When the landing or takeoff zone is mobile, a drawback stems from the difficulty of making decisions rapidly to authorize the manoeuvres of a remotely controlled aircraft while guaranteeing maximum safety in the vicinity.

Typically, when the landing takes place on a ship, the swell, the wind and the vertical motions of the aircraft and of the ship may comprise risks in the execution of the manoeuvres.

A deck-landing is a manoeuvre involving numerous risks, notably human risks for the personnel on the ship and hardware risks be they to the aircraft or to the ship in the case of a collision arising from a failed deck-landing.

Authorization for a deck-landing may be given only if all the safety criteria are complied with. The criteria are fixed as a function of each aircraft and of each ship. They may be for example the following:
  the deck-landing zone is clear;
  the attitudes of the aircraft and of the ship are within the limits, notably yaw, roll, pitch, and speed;
  the amplitude of the swell does not exceed a certain limit;
  the wind on the deck is favourable, notably as regards its strength and its direction.

These limits are established on the one hand as a function of the physical characteristics of aircraft notably of their power and of their weight and on the other hand as a function of the capacities of the ship, notably of its size and of the height of the deck. Finally these limits are established for various wind directions and various amplitudes of the swell.

All these limits are established for a given aircraft/ship pair.

The sequence of a landing of a rotary-wing aircraft is not linear, unlike the sequence of a landing of a fixed-wing aircraft. Notably, the expression linear sequence is understood to mean the fact that a landing of a rotary-wing aircraft is tied to a duration for which favourable deck-landing conditions are required. In the landing of fixed-wing aircraft, an authorization is given and it remains valid from the moment the authorization is given.

Concerning fixed-wing aircraft, the aircraft initiates its deck-landing. A decision point makes it possible to verify, before this point, that if all the deck-landing conditions are met then the aircraft continues its deck-landing sequence otherwise it performs a clearance procedure, that is to say it cancels the deck-landing.

Indeed, the deck-landing sequence is generally as follows:
  the aircraft nears the deck so as to initiate the deck-landing;
  it then regains a position above the deck, situated between 10 to 20 meters to the rear of the deck;
  once this position has been regained, it is possible for it to land on deck if the required conditions are all met;
  if these conditions are not satisfied, the aircraft then commences a standby phase while hovering;
  once the required conditions are satisfied, it is authorized to land on deck.

Furthermore, the decision to land on deck, subsequent to a hovering phase, is not automatic. It is carried out after validation by an operator who is on the ship.

The operator must therefore ascertain in real time the validity or otherwise of each of the required conditions so as to authorize the deck-landing and thus terminate the phase of hovering above the ship.

A problem encountered in this configuration is that the hovering step is considered to be a risky step, the aircraft being situated above the ship and therefore in a zone close to an infrastructure where personnel are grouped together and being moreover in an aerology disturbed by the ship.

Consequently, it is essential to limit the aircraft's standby duration when it is hovering in a situation ready to land on deck. The operator therefore has the responsibility of authorizing deck-landing as soon as an opportunity arises while ensuring a maximum level of safety. If the operator lacks a slot when the conditions are all met, he must wait for a next slot. A problem is that the next slot in which deck-landing will be possible may arise only a few minutes later in order for all the conditions favourable to deck-landing to be met depending on alterations in these conditions.

Currently, the operator alone evaluates a certain number of parameters whereby the deck-landing of an aircraft may or may not be authorized. There is no device which enables the operator to be afforded a decision aid notably a device which would enable the operator's task to be lightened.

In particular, the deck-landing of a rotary-wing aircraft on a mobile vehicle such as a ship is at present a risky operation.

Currently, the operator on the ship is constrained to evaluate compliance or otherwise with each of the criteria favourable or unfavourable to deck-landing at each instant "t". When all the criteria are met to authorize a deck-landing, the operator can authorize a deck-landing by actuating a control which allows the aircraft to be given a green light. The aircraft can then go ahead with a procedure for landing on the ship's deck.

If the criteria are poorly judged by the operator through lack of time or because of a human evaluation error, a risk may arise during the deck-landing. On the other hand, if the operator decides to wait for slots in which all the conditions for authorizing a deck-landing are met, he may be caught off guard and not have time to acknowledge the situation so as to transmit a deck-landing directive to the aircraft. Thus one risk is to keep the aircraft hovering in conditions which may cause an additional risk.

A drawback in the latter case is that it increases the time for which the aircraft is hovering above the ship and that it increases the risks of accident when the meteorological conditions are for example fluctuating. It is even possible that the aircraft may quit its hovering situation and leave so as to recommence an approach or find another solution.

SUMMARY OF THE INVENTION

The invention is alleviates the aforementioned drawbacks. The invention makes it possible to optimize the aid for assisting an operator who must make a decision as to whether or not to authorize an aircraft to land on the deck of a mobile vehicle. The invention allows for the checking of a certain number of criteria so as to determine predictive time windows during which a deck-landing of the aircraft may be authorized. The windows are generated by a computer, it gives a state of the favourable or unfavourable conditions for authorizing a deck-landing in the near future.

Advantageously, the device for aiding the deck-landing of an aircraft, the aircraft being controlled remotely from a mobile station, called a ship, comprises means for receiving data from the aircraft, notably attitudes of the aircraft, the aircraft hovering ready to land on deck, the deck-landing decision having to be made under certain conditions that must all be met, the conditions comprising a first set of predictive criteria and a second set of non-predictive criteria.

Advantageously, the device comprises a computer making it possible to deliver at least one temporal indicator indicating that the predictive criteria are favourable or unfavourable to a deck-landing, a display making it possible to represent the indicator in a first state when the predictive criteria are favourable.

Advantageously, the device comprises acknowledgement means allowing an operator to acknowledge the non-predictive criteria, the temporal indicator generated previously by the computer being represented in a second state when the operator acknowledges the non-predictive criteria.

Advantageously, the temporal indicator comprises at least one window scrolling over a time-graduated gauge.

Advantageously, a time limit is defined in such a way that a window sliding beyond this time limit and for which the window's remaining time no longer allows the deck-landing of the aircraft, no longer allows the operator to acknowledge the non-predictive criteria for this window.

Advantageously, the temporal indicator is represented in a third state when the window oversteps the time limit whilst the operator has acknowledged the non-predictive criteria.

Advantageously, the temporal indicator is represented in a fourth state when the window oversteps the time limit whilst the operator has not acknowledged the non-predictive criteria.

Advantageously, the predictive criteria comprise a value corresponding to the exceeding of at least one authorized maximum deviation of an attitude of the ship.

Advantageously, the predictive criteria comprise a value corresponding to the exceeding of at least one authorized maximum deviation of an attitude of the aircraft.

Advantageously, the predictive criteria comprise a value corresponding to the exceeding of an authorized maximum deviation of the amplitude of the swell.

Advantageously, the predictive criteria comprise a value corresponding to the exceeding of an authorized maximum deviation of the strength of the wind at deck level.

Advantageously, the predictive criteria comprise a value corresponding to the direction of the wind at deck level.

Advantageously, the non-predictive criteria comprise the finding that the zone of the deck is clear.

Advantageously, the aircraft comprises means for receiving the data generated by the computer of the ship and display means making it possible to display the temporal indicator.

BRIEF DESCRIPTION OF THE DRAWINGS

Other characteristics and advantages of the invention will become apparent with the aid of the description which follows, given in conjunction with the appended drawings which represent.

DETAILED DESCRIPTION

Figure 1:
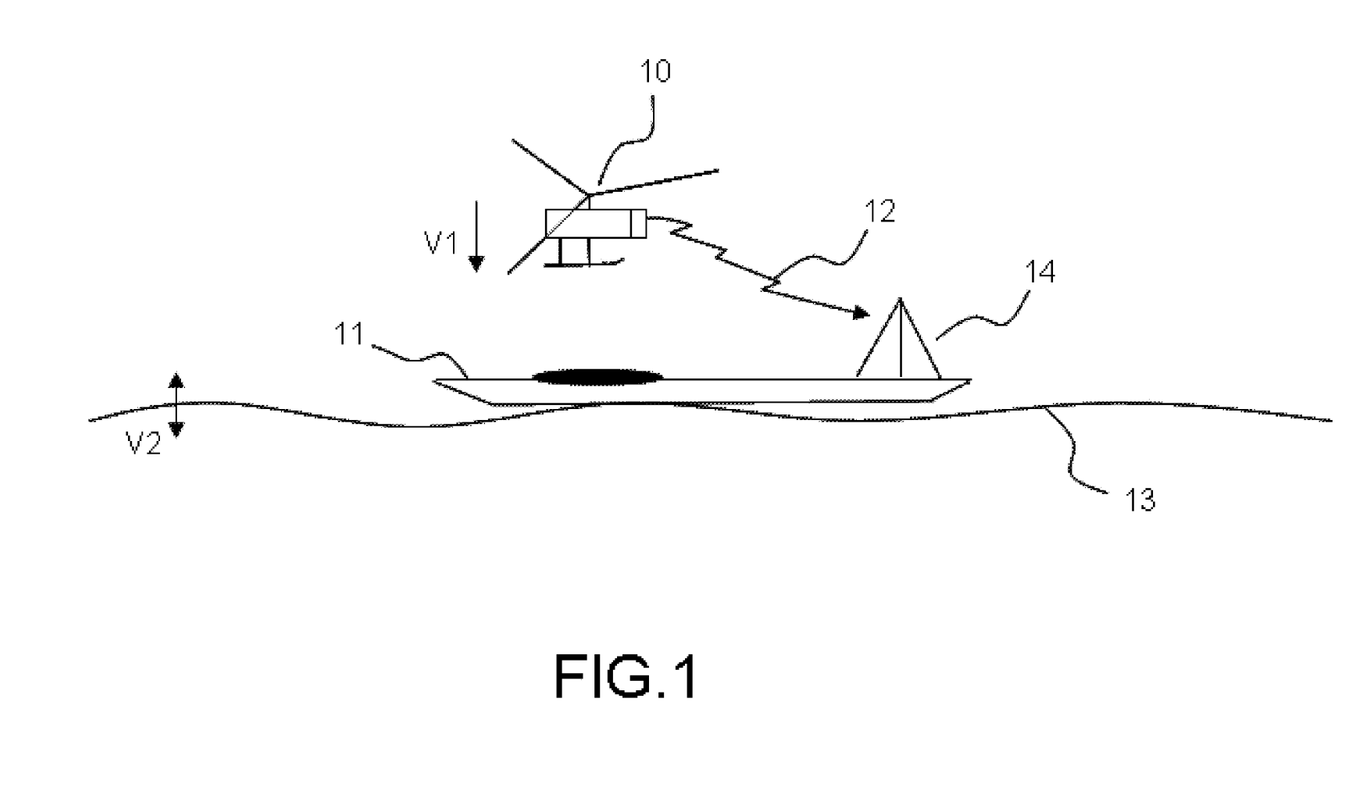
FIG. 1: a configuration, in which the invention applies, of an aircraft hovering above a ship.

FIG. 1 represents a configuration in which the invention applies. It involves a typical case in which an aircraft 10 is hovering above the ship. The aircraft, partly remotely controlled, will undertake an on-ship deck-landing scenario if and only if it is given authorization to land on deck.

The hovering aircraft 10 waits for a directive which may be for example an acknowledgement of a deck-landing request dispatched to the control tower 14 of the ship 11.

In FIG. 1, the aircraft 10 is hovering, in a position ready to land on deck. The control tower 14 receives information from the aircraft 10, notably as regards its vertical speed V1, its dynamics such as its attitudes and certain flight conditions. The operator must be able to check a certain number of criteria related to the aircraft or independent of the aircraft so as to authorize or to deny the deck-landing. In the case of denial, the aircraft keeps hovering above the ship while awaiting a next authorization.

The operator must provide a directive to the aircraft making it possible to start the deck-landing or otherwise. The deck-landing comprises the descent of the aircraft 10 above the deck of the ship 11 and then the landing proper when the aircraft 10 touches down on the ship 11 until it stabilizes.

The operator, who gives the deck-landing directive, must be sure of a certain number of favourable criteria to validate the directive authorizing the aircraft to land on deck. A solution of the invention is aimed at providing the operator, by way of a display, with a predictive indicator offering him time windows, also called deck-landing windows, during which predictive criteria are favourable to deck-landing.

The predictive criteria are notably the attitudes of the aircraft and of the ship such as yaw, roll and pitch, the amplitude and the speed of the swell, the strength and the direction of the wind on the deck. These criteria correspond to parameters measurable by a computer and whose value may be extrapolated in the near future.

The extrapolation can be done through knowing initial or current conditions and by the application by the computer of known models. For example, alterations in the weather or the swell in the near future may be extrapolated according to models.

The dynamics of the aircraft as well as that of the ship may also be predicted in the near future on the basis of known initial conditions.

Other criteria, termed non-predictive criteria, such as the verification that the deck is clear may not be taken into account by a computer.

The invention makes it possible to avail the operator of means for acknowledging these criteria. They are then acknowledged manually by the operator. The invention makes it possible to verify that if a predictive indicator is favourable to deck-landing and the operator acknowledges the non-predictive criteria, then a deck-landing authorization is validated and is dispatched to the aircraft.

An embodiment of the invention makes it possible to define several states of the predictive indicator so as to indicate graphically on this indicator whether or not the operator's acknowledgement has been taken into account.

The predictive indicator comprises several states according to whether the predictive or non-predictive criteria are favourable to deck-landing and according to the actions of an operator. The predictive indicator embraces at one and the same time the evaluation of the predictive criteria, carried out by the computer, and the evaluation of the non-predictive criteria, carried out by the operator. The combination of these two evaluations leads to a predictive indicator with four distinct states.

Each state comprises a representation which allows the operator to ascertain the status of the set of criteria necessary for the deck-landing.

A first state makes it possible to signal that only the predictive criteria are favourable to deck-landing.

A second state making it possible to signal that the non-predictive criteria are favourable to deck-landing, subsequent to an acknowledgement from the operator.

This second state allows an operator, who would have acknowledged the non-predictive criteria in advance, to know that the deck-landing windows, which arrive, have taken this acknowledgement into consideration. This avoids, in doubt, the need for an operator to have to acknowledge a window several times.

A third state makes it possible to signal that the non-predictive and predictive criteria are favourable to deck-landing. This third state is active when the deck-landing windows are then sufficiently close to the deck-landing to be taken into account by the computer, that is to say a predefined time limit makes it possible to test whether the prediction of the deck-landing window is not too distant.

Finally a fourth state makes it possible to signal that the predictive criteria are favourable to deck-landing but that the operator has not acknowledged the non-predictive criteria in time. In the latter case it will not be possible for the deck-landing to be done in the deck-landing window whose representation indicates this fourth state.

Accordingly, the invention comprises a computer which evaluates the state of each of the predictive criteria over time and deduces therefrom a set of windows of variable duration during which the validity of the predictive criteria is satisfied.

The evaluation of the criteria is carried out by comparing current values with thresholds predefined in the device of the invention. Thus, it is possible to configure the desired degree of safety for the deck-landing by predefining more or less critical thresholds.

On the other hand, if the conditions are too severe to authorize a deck-landing, the aircraft can keep hovering and wait for a next authorization from the ship.

The invention therefore allows great adaptation to the environmental conditions, notably in variants of the invention it is possible to configure the number of predictive criteria to be analysed by the computer.

The predictions proposed by the computer are re-evaluated regularly. In one embodiment the criteria are re-evaluated every second.

Figure 2:
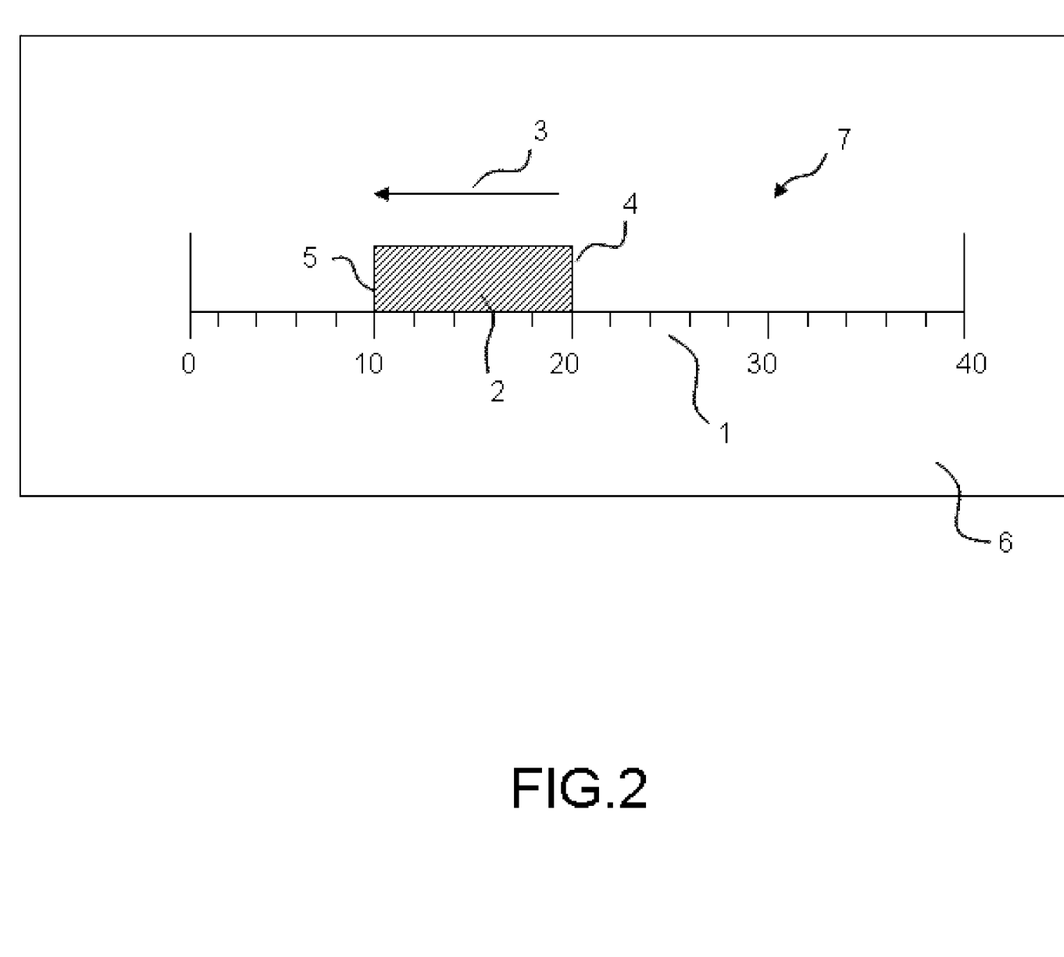
FIG. 2: a predictive deck-landing window according to the invention.

FIG. 2 represents an indicator 7 according to the invention which is generated in a display 6.

The indicator 7 comprises a fixed graduated scale 1 and when the predictions of the criteria evaluated by the computer are all met as being favourable for the deck-landing of the aircraft then a window 2 symbolizes the forthcoming duration for which the deck-landing will be possible.

The operator can therefore validate the directive authorizing the aircraft to land on deck in the form of an acknowledgement making it possible to choose the window during which the aircraft will be able to land on the ship's deck.

The invention allows the operator to have to check just a single indicator for all the predictive criteria.

The fact that numerous criteria have to be validated is a drawback that is resolved by the invention. Since all the predictive criteria are handled by the computer and enables the operator's tasks to be lightened.

The operator can therefore concentrate on the non-predictive criteria such as the clearance of the deck-landing zone so as to transmit the deck-landing directive. He can therefore evaluate, while minimizing the assessment errors, the non-predictive criteria instigating the aircraft's deck-landing sequence.

With the solution of the invention, the operator can give an acknowledgement as soon as the first window appears. The hovering time above the ship is thus limited and the risks of errors of assessment of the predictive criteria are also reduced.

The invention therefore comprises an indicator which comprises a graduated temporal gauge whose scale can be parametrized by the operator. Within this gauge, the windows scroll along the graduation in real time. They indicate the intervals where the deck-landing may be carried out.

The intervals forming the predictive windows are generated on the basis of a computer which makes it possible to ascertain the instants in a forthcoming period where all the predictive criteria satisfy certain predefined limits.

The window 2 scrolls in the example of FIG. 2 from right to left.

The time remaining before reaching a window is read with the aid of the graduations, in the example of FIG. 2, the start of the window is marked by the side 5 of the window which is at the level of the graduation indicating 10 s at the instant of reading. Likewise, it is possible to read the time corresponding to the end of the window with the aid of the side 4 which is at the level of the graduation indicating 20 s.

It is understood by reading the indicator 7 that the aircraft can land on deck in 10 s, this being so for a duration of 10 s.

If the directive is validated by the operator, then the window 2 will be validated and a message will be dispatched to the aircraft to indicate that the deck-landing procedure may be instigated at a certain time.

The invention makes it possible to distinguish various statuses of the predictive deck-landing windows. For example, in one embodiment a colour code makes it possible to determine the status of each of the windows.

Concerning the first state, a first colour, for example yellow, makes it possible to represent a window on standby awaiting acknowledgement by the operator. The window then indicates that the predictive criteria in the time period of the window are validated by the computer and that the non-predictive criteria which may be validated only by the operator have not yet been acknowledged. This involves the first state which corresponds to a temporary state in which the predictive deck-landing window may be or may not be validated by the operator.

If the operator does not acknowledge the window, it remains in the same state until a certain limit time allowing the validation of the window. This limit may be predefined, it may correspond to a duration below which the aircraft will no longer have time to receive the directive and to instigate a deck-landing before the end of the window.

The window remains in a representation indicating that it is in the first state until this time limit. No directive is dispatched to the aircraft to land on deck until this limit.

Concerning the second state, a second colour makes it possible to represent a time window when the operator has acknowledged the non-predictive criteria in advance. This configuration can occur when all the non-predictive criteria are favourable to deck-landing and when a priori in the near future nothing induces alterations in these criteria. The operator can therefore acknowledge these criteria. In this case the deck-landing windows scrolling over the display in the indicator change state upon the acknowledgement of the operator and therefore make it possible to remind the operator that the acknowledgement has already taken place. This second state makes it possible to prevent an operator from acknowledging a window several times when he is in doubt as to whether he has done so. This second may be represented by a colour filling in the deck-landing window which scrolls; this may for example be blue.

Concerning the third state, a third colour makes it possible to represent a time window during which the predictive criteria have been evaluated as favourable to deck-landing by the computer and the non-predictive criteria have been acknowledged by the operator. This colour may be for example green.

In the latter case a directive is dispatched to the aircraft which authorizes a deck-landing at an indicated time corresponding to the period in which the deck-landing is possible.

Concerning the fourth state, a second colour, such as grey, makes it possible to represent a window which has been rejected by the operator. The latter not having acknowledged the non-predictive criteria in time. The aircraft will therefore not be able to land on deck in the course of this window. With the passage of the previously defined limit, the window changes state, it is then in the fourth state. The change of state may be represented on the display by a change of colour of the deck-landing window.

In the example of FIG. 2, the window, where the predictive criteria are favourable to deck-landing arising, is not yet acknowledged by the operator. This window is still in the first state for the following reason: the operator has not acknowledged the window because one of the non-predictive criteria is not favourable to the deck-landing of the aircraft. For example, this criterion may be: "there are personnel in the deck-landing zone".

The invention therefore allows the generation of a time gauge over which at least one window with the following attributes scrolls:
  a start time represented by the side 5 of the window of FIG. 2;
  an end time represented by the side 4 of the window of FIG. 2;
  a colour according to the state;
The invention makes it possible to implement various scenarios.

Figure 3A:
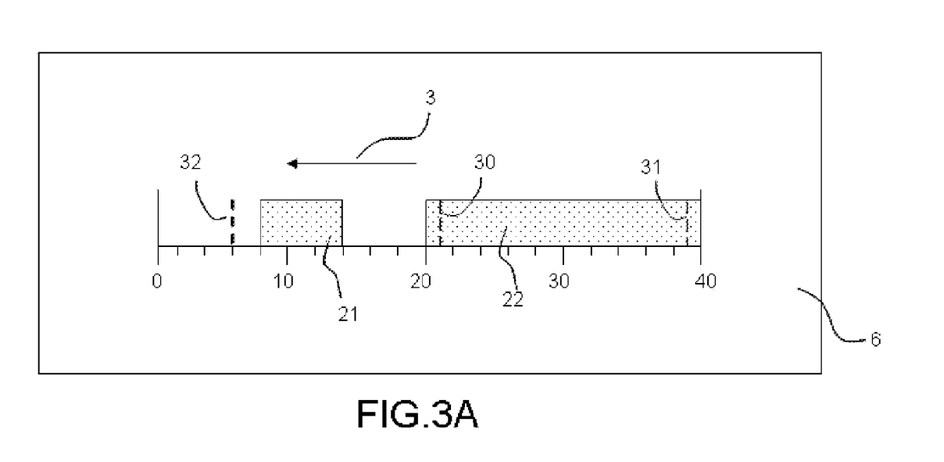
FIG. 3A: the appearance of two deck-landing windows in a first state.

FIG. 3A represents the appearance of two deck-landing windows 21, 22.

The computer has provided a first deck-landing window 21 and a second deck-landing window 22 whose characteristics are:
  start of the first window in 8 seconds and end of the first window in 14 seconds;
  start of the second window in 20 seconds and end of the second window in 40 seconds.

The operator has given no acknowledgement of the non-predictive parameters. The windows are represented in such a way that the operator views straight away the state of the deck-landing windows.

In FIG. 3A, two windows 21, 22 of different size appear. They are represented with a certain colour which is represented in FIG. 3A by a block comprising dots. This representation makes it possible to understand that only the predictive criteria have been acknowledged. The operator has not yet acknowledged the windows 21, 22 signifying that the non-predictive criteria have not been validated by the operator or that he judges for example that a window is too short. In the latter case he waits for the next deck-landing window.

Figure 3B:
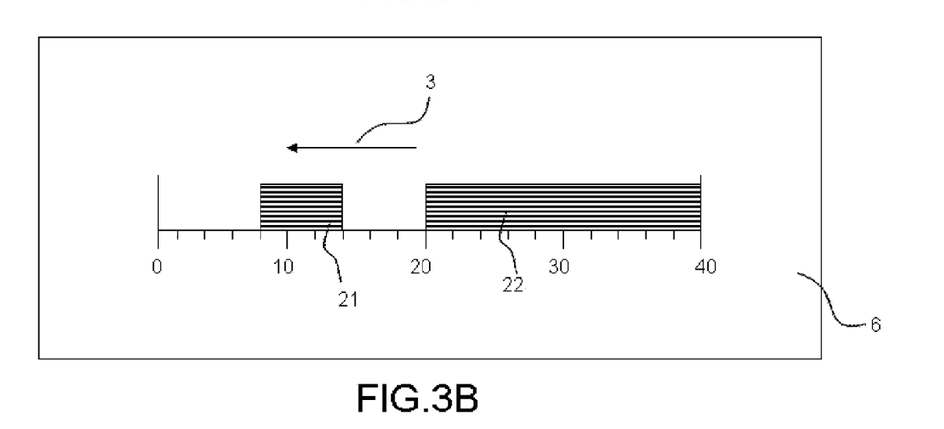
FIG. 3B: the two deck-landing windows in a second state.

FIG. 3B represents the typical case of FIG. 3A when the operator has already acknowledged the non-predictive criteria before the deck-landing windows are generated by the computer. In this case the deck-landing windows are represented with another colour or a pattern other than in the typical case of FIG. 3A.

The operator then knows that the non-predictive criteria have already been acknowledged, thereby avoiding any doubt on his part that might induce him to reacknowledge the non-predictive criteria.

Figure 3C:
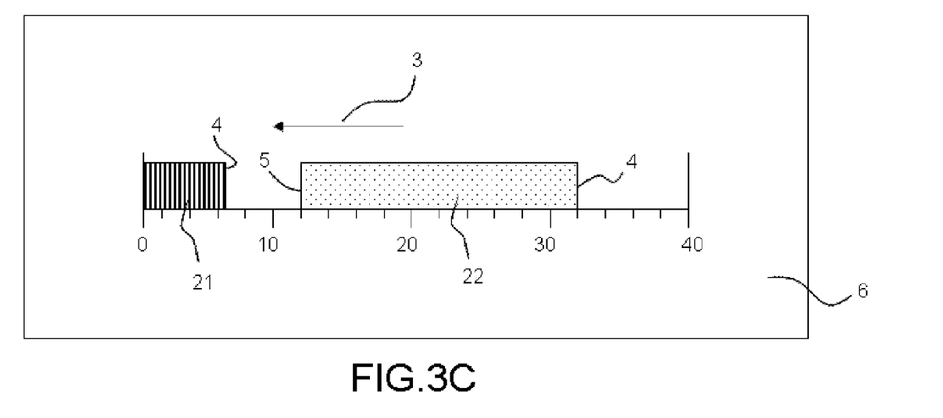
FIG. 3C: the two deck-landing windows in a second and a fourth state.

FIG. 3C represents the case of FIG. 3A but a few seconds later. The predictive deck-landing window 21 has not been acknowledged by the operator; it is therefore rejected. That is to say no directive will be dispatched to the aircraft authorizing the deck-landing during the period corresponding to the window 21.

The computer has provided a first deck-landing window 21 and a second deck-landing window 22 whose characteristics are:
  start of the first window in 0 seconds and end of the first window in 6 seconds,
  start of the second window in 12 seconds and end of the second window in 32 seconds;

At the instant of FIG. 3C, the operator has given no acknowledgement for either of the two windows arising.

In a first variant embodiment, the operator is given the possibility of allocating an acknowledgement to one of the windows arising in the indicator 7.

In a second variant embodiment, the operator's acknowledgement relates to the next window displayed for which the computer has validated the predictive deck-landing criteria.

In one embodiment the overly short duration windows, for which the criteria favourable to a deck-landing are all met, are not displayed. The operator can configure a minimum duration for which the criteria favourable to deck-landing must all be met.

It is necessary for the aircraft to have a minimum time to approach the deck-landing zone. The invention makes it possible to take this constraint into consideration.

The window 21 which is dotted in FIG. 3A comprises stripes in FIG. 3C signifying that it has changed state. In the figures, colours have been replaced with patterns.

The change of state of the predictive deck-landing window 21 signifies that the operator has not acknowledged the non-predictive criteria in time. A certain limit passes, meaning that the operator can no longer acknowledge a window.

The invention makes it possible to define a time limit 32 beyond which the operator can no longer acknowledge the current window, this limit is chosen such that the aircraft has time to receive the directive so as to be able to execute it, that is to say to land on deck. Generally, before carrying out the deck-landing while waiting for a favourable directive from the ship, the aircraft is positioned at a particular point above the deck, hovering ready to begin the deck-landing; this point is called the waiting point. The waiting point may also be slightly shifted with respect to the deck for safety. In this typical case, the mean duration to land on deck, that is to say between the waiting point and the landing point, is known. This mean duration makes it possible to configure in the device of the invention the time limit.

In an exemplary embodiment, the duration of this time limit may be 6 seconds, as represented in FIG. 3C.

When the time limit to acknowledge a window has passed, the computer no longer makes it possible to take the operator's acknowledgement into account. The state of the window is therefore modified, the window passes to a "denied" status. In this case, even if the operator gives his acknowledgement to generate a deck-landing directive, it will no longer be possible to validate the window 21 in FIG. 3B. The acknowledgement of the non-predictive criteria of the operator will be taken into account for a next window which will pass to the previously defined fourth state.

Figure 3D:
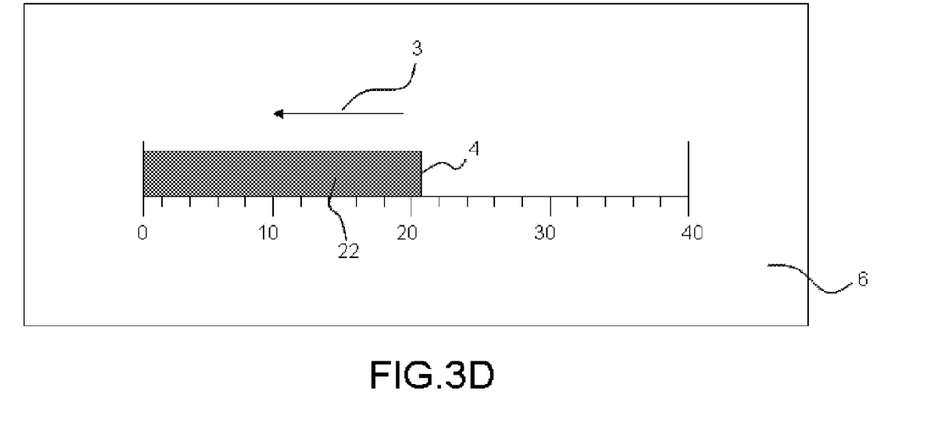
FIG. 3D: a deck-landing window in a third state.

Finally, FIG. 3D represents the same case as FIGS. 3A and 3B but the window 21 has passed and is no longer represented. The predictive deck-landing window 22 then scrolls too. In this scenario, the operator has acknowledged the window 22. It has changed state, its representation indicates that a directive will be dispatched to the aircraft authorizing it to land on the ship's deck.

The computer has provided a second deck-landing window 22 whose characteristics are at the instant of FIG. 3D: start of the second window in 0 seconds and end of the second window in 20 seconds;

The operator has given his acknowledgement of the non-predictive criteria so that the aircraft commences its deck-landing.

The window 22, still temporary in FIG. 3B, has now been acknowledged by the operator. This is represented in a distinct manner in the indicator represented on the display 6.

Under these conditions, the aircraft can start its deck-landing from the moment when the state of the window 22 has changed in such a way that the aircraft touches down on the deck of the ship before the side 4 of the window reaches the graduation 0 of the gauge. That is to say the deck-landing starts in such a way that the aircraft touches down when the graduation 0 is situated in the current deck-landing window.

In one embodiment, a first interior margin 30 of the window 22 for the side 5 and a second interior margin 31 of the window 22 for the side 4 may be preconfigured in such a way that the aircraft does not touch down on the deck at the limit of the time during which it is authorized to land on deck. The margins 30, 31 are represented in FIG. 3A.

In one mode of implementation the margin may be one second.

The invention therefore comprises numerous advantages, notably it makes it possible to embrace all the predictive criteria within a single indicator which comprises temporal symbols.

Each symbol advantageously represents a duration for which the predictive criteria are favourable to a deck-landing. Furthermore, each symbol corresponding to a duration called a predictive deck-landing window. It is represented in real time on a graduated temporal gauge. This representation allows an operator to act with awareness while checking and monitoring the non-predictive criteria.

The invention therefore allows the deck-landing phases to be made safe by guaranteeing that the operator's check is redundant in respect of the predictive criteria of a computer's check.

What is claimed is:

1. A device for aiding the deck-landing of a pilotless rotary-wing aircraft on a mobile station, called a ship, the aircraft being intended to be controlled remotely on the basis of said device, comprising:
   means for receiving data from the aircraft, comprising attitudes of the aircraft and a computer, the aircraft hovering ready to land on deck, the deck-landing decision having to be made under certain conditions comprising a first set of predictive criteria and a second set of non-predictive criteria, the predictive criteria corresponding to parameters measured by the computer and whose value may be extrapolated in the near future, the predictive criteria relating to the attitudes of the aircraft and of the ship, amplitude and speed of the swell, a strength and direction of wind on the deck of the ship, the non-predictive criteria corresponding to parameters not measurable by the computer, the non-predictive criteria relating to the clearance of the deck,
   wherein the computer makes it possible to deliver at least one temporal indicator indicating that the predictive criteria are favourable or unfavourable to a deck-landing, and a display making it possible to represent the indicator in a first state when the predictive criteria are favourable to deck-landing.

2. A device for aiding the deck-landing of an aircraft according to claim 1, wherein the device further comprises acknowledgement means allowing an operator to acknowledge the non-predictive criteria, the temporal indicator generated previously by the computer being represented in a second state when the operator acknowledges the non-predictive criteria.

3. A device for aiding the deck-landing of an aircraft according to claim 1, wherein the temporal indicator comprises at least one window scrolling over a time-graduated gauge.

4. A device for aiding the deck-landing of an aircraft according to claim 3, wherein a time limit is defined in such a way that a window sliding beyond this time limit and for which the window's remaining time no longer allows the deck-landing of the aircraft, no longer allows the operator to acknowledge the non-predictive criteria for this window.

5. A device for aiding the deck-landing of an aircraft according to claim 4, wherein the temporal indicator is represented in a third state when the window oversteps the time limit whilst the operator has acknowledged the non-predictive criteria.

6. A device for aiding the deck-landing of an aircraft according to claim 4, wherein the temporal indicator is represented in a fourth state when the window oversteps the time limit whilst the operator has not acknowledged the non-predictive criteria.

7. A device for aiding the deck-landing of an aircraft according to claim 1, wherein the predictive criteria comprise a value corresponding to the exceeding of at least one authorized maximum deviation of an attitude of the ship.

8. A device for aiding the deck-landing of an aircraft according to claim 1, wherein the predictive criteria comprise a value corresponding to exceeding at least one authorized maximum deviation of an attitude of the aircraft.

9. A device for aiding the deck-landing of an aircraft according to claim 1, wherein the predictive criteria comprise a value corresponding to exceeding an authorized maximum deviation of the amplitude of the swell.

10. A device for aiding the deck-landing of an aircraft according to claim 1, wherein the predictive criteria comprise a value corresponding to exceeding an authorized maximum deviation of the strength of the wind at deck level.

11. A device for aiding the deck-landing of an aircraft according to claim 1, wherein the predictive criteria comprise a value corresponding to the direction of the wind at deck level.

12. A device for aiding the deck-landing of an aircraft according to claim 1, wherein the non-predictive criteria comprise the finding that a zone of the deck is clear.

13. A device for aiding the deck-landing for an aircraft according to claim 1, wherein the aircraft comprises means for receiving the data generated by the computer of the ship and display means making it possible to display the temporal indicator.

14. A device for aiding the deck-landing of a pilotless rotary-wing aircraft on a mobile station, called a ship, the aircraft being intended to be controlled remotely on the basis of said device, comprising:
a computer configured to obtain attitudes of the aircraft, the aircraft hovering ready to land on deck, the deck-landing decision having to be made under certain conditions comprising a first set of predictive criteria and a second set of non-predictive criteria, the predictive criteria corresponding to parameters measured by the computer and whose value may be extrapolated in the near future, the predictive criteria relating to the attitudes of the aircraft and of the ship, amplitude and speed of swell, a strength and direction of wind on the deck of the ship, the non-predictive criteria corresponding to parameters not measurable by the computer, the non-predictive criteria relating to the clearance of the deck,
wherein the computer makes it possible to deliver at least one temporal indicator indicating that the predictive criteria are favourable or unfavourable to a deck-landing, and a display making it possible to represent the indicator in a first state when the predictive criteria are favourable to deck-landing.

15. The device for aiding the deck-landing of an aircraft according to claim 14, wherein the device is further configured to allow an operator to acknowledge the non-predictive criteria, the temporal indicator generated previously by the computer being represented in a second state when the operator acknowledges the non-predictive criteria.

16. A device for aiding a deck-landing of a pilotless rotary-wing aircraft on a ship, the aircraft being controlled remotely on a basis of the device, comprising:
a computer configured to obtain attitudes of the aircraft, the aircraft hovering ready to land on deck, a deck-landing decision being made under certain conditions comprising a first set of predictive criteria and a second set of non-predictive criteria, the predictive criteria corresponding to parameters measured by the computer and whose value may be extrapolated in the near future, the predictive criteria relating to the attitudes of the aircraft and of the ship, amplitude and speed of swell, a strength and direction of wind on the deck of the ship, the non-predictive criteria corresponding to parameters not measurable by the computer, the non-predictive criteria relating to the clearance of the deck;
the computer being configured to deliver at least one temporal indicator indicating that the predictive criteria are favourable or unfavourable to a deck-landing; and
a display configured to represent the indicator in a first state when the predictive criteria are favourable to deck-landing.

17. The device for aiding the deck-landing of an aircraft according to claim 16, wherein the device is further configured to allow an operator to acknowledge the non-predictive criteria, the temporal indicator generated previously by the computer being represented in a second state when the operator acknowledges the non-predictive criteria.

* * * * *